April 30, 1974     L. A. PRADT     3,808,126
WET OXIDATION
Filed Nov. 26, 1971
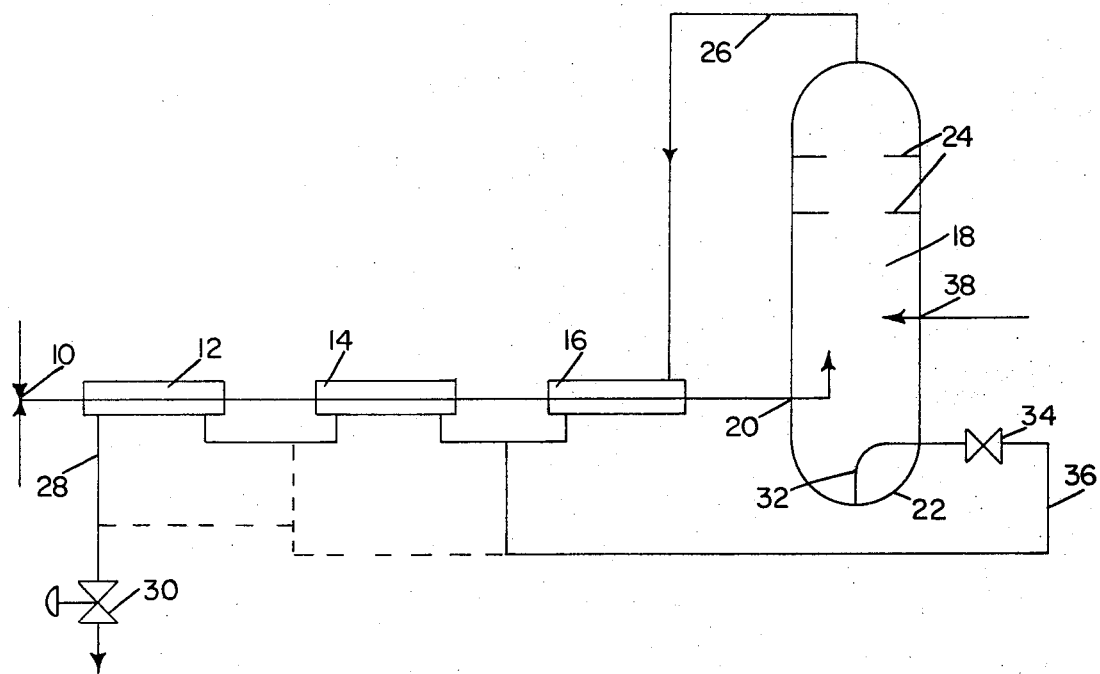

WET OXIDATION

Louis A. Pradt, Wausau, Wis., assignor to Sterling Drug Inc., New York, N.Y.
Filed Nov. 26, 1971, Ser. No. 202,377
Int. Cl. C02b 1/02
U.S. Cl. 210—63                                     6 Claims

ABSTRACT OF THE DISCLOSURE

A method of wet oxidation or heat treatment of sludge and liquor in which the sludge or liquor is introduced into the reactor tank or enclosure at a point above the bottom thereof, and solids settling to the bottom are piped away from this point, and reintroduced at a point in the reactor outlet flow stream preferably through the heat exchangers preheating the incoming sludge or liquor.

BACKGROUND OF THE INVENTION

In the construction and operation of wet oxidation and heat treatment systems for sludge and raw liquors it is preferred to use an upflow reactor. A down-flow reactor has been used for heat treatment but such a system requires a level control device and gas venting equipment thereby increasing the cost and complexity of the system.

In an upflow reactor, the inert particulate solids freed from the organic matter by the wet oxidation or heat treatment process, tend to settle to the bottom of the reactor and therefore it is necessary to periodically clean or drain the reactor requiring that the unit be shut down. Attempts to drain reactors during operations have not heretofore been successful due to plugging of the valves and piping and excess wear thereon.

It is the purpose of the present invention to provide a method of continuously or semi-continuously removing the inert solids from the bottom of the reactor and at the same time avoiding the problems enumerated above.

SUMMARY OF THE INVENTION

The sludge or sludge and air are introduced (after passing through heat exchangers) into the reactor some distance e.g., 6 feet above the bottom of the reactor tank or enclosure. Inert solids not carried up and out of the reactor will settle into the space in the reactor below the inlet. A drain pipe is run from the reactor bottom through the reactor housing wall to a drain valve and this drain valve may be operated by opening it fully for intermittent periods or operating it continuously as the situation may require.

The slurry containing these settled out solids passes out of the reactor through the valve mentioned and is reintroduced at a point in the reactor outflow flow stream, and with a major portion of the liquid along with the solids that are carried up the reactor and the outlet gases, passes out of the system through a control valve. The pressure at the point of the introduction of the settled solids into the reactor outlet flow stream from the top of the reactor. that at the reactor bottom due to the pressure drop in the reactor oule flow stream from the top of the reactor. However, this pressure difference is moderate, allowing the drain valve for the settled out slurry to be opened fully for intermittent periods or even continuously if desired. The slurry draining from the reactor bottom can be passed through one or more of the heat exchangers cooling it before it passes out of the system, and a feature of the system is that only one valve is required to throttle flow the outlet flow from the full system pressure.

The air can be introduced along with the sludge to the reactor or it can also be introduced separately either above or below the entrance of the sludge into the reactor.

BRIEF DESCRIPTION OF THE DRAWING

The figure is a diagram illustrating the invention.

PREFERRED EMBODIMENT OF THE INVENTION

Referring now to the drawing, the sludge liquor (and the air desired) enter the system as is well known in the art at point 10 passing through heat exchangers as for instance 12, 14, and 16 and into the reactor tank enclosure 18 through an inlet 20 well above the bottom 22 of the tank. As an example, the inlet 20 may be about 6 feet above the bottom 22 of the tank.

The reactor may be provided with baffles such as at 24 and major portion of the liquid along with the solids that are carried up the reactor and the gases proceed out of the reactor through the pipe 26. In the case as shown the aforesaid major portion of the liquids along with solids that are carried up the reactor and the gases may be passed back through the heat exchangers thereby tending to cool before passing out of the system as for instance at 28 under control of throttle valve 30.

A drain pipe 32 is applied to the bottom of the tank at the interior thereof, and runs from the reactor bottom through the reactor wall to a drain valve 34. Valve 34 is in a pipe 36 which runs, reversely, to the heat exchangers 16, 14, and 12 being reintroduced into the outflow stream from pipe 26 from the reactor, to the heat exchangers, and the solids from the bottom of the reactor therefore pass out of the system through valve 30 along with the reactor outlet flow stream. Only the single valve 30 is therefore needed to control this flow.

Valve 34 may be opened continuously or intermittently according to the demands for cleaning. At the point of introduction of the solids through pipe 36 into the heat exchangers there will be a lower pressure than that at the reactor bottom due to the pressure drop in the reactor outlet flow stream but this pressure difference is a moderate one and allows valve 34 to be opened fully either continuously or for intermittent periods.

In the case of wet oxidation the air can be introduced along with the sludge as described or it can be introduced separately as shown at point 38 and the reactor may be equipped with the baffles described.

I claim:

1. A method for the wet oxidation or heat treatment of sludge or liquor utilizing a reactor and an outlet at the top thereof for a high pressure outlet flow stream of the gases and treated products produced, and preheating the sludge or liquor proceeding to the reactor by means of said high pressure outlet flow, comprising the step of introducing the sludge or liquor into the reactor enclosure at a point above the bottom of the reactor, there being solids in the sludge or liquor, certain of the solids being carried up and out through the outlet at the top of the reactor, and certain of the solids tending to settle to the bottom below the point of entrance of the sludge or liquor, removing the settled solids through a conduit at the bottom of the reactor at the same time the reaction is taking place, and adding to the heat of the high pressure outlet flow stream by introducing the solids removed from the reactor bottom directly into the high pressure outlet flow stream.

2. The method of claim 1 wherein the sludge or liquor is preheated, and including introducing the settled solids to the outlet flow stream in the preheat area, and then passing the combined settled solids and reactor outlet flow stream outside the system.

3. The method of claim 1 in which the settled solid materials are removed from the reactor bottom intermittently.

4. The method of claim 1 in which the settled solids are removed from the reactor bottom continuously.

5. The method of claim 1 wherein air is introduced separately into the reactor from the point of introduction of the sludge into the reactor.

6. The method of claim 1 wherein the reactor is baffled at a point above the sludge or liquor inlet.

References Cited
UNITED STATES PATENTS

| | | | |
|---|---|---|---|
| 3,591,449 | 7/1971 | Hess et al. | 210—71 X |
| 3,649,534 | 3/1972 | Schotte | 210—63 |
| 3,219,579 | 11/1965 | Kranz | 210—71 X |

SAMIH N. ZAHARNA, Primary Examiner

R. H. SPITZER, Assistant Examiner

U.S. Cl. X.R.

210—71

UNITED STATES PATENT OFFICE
CERTIFICATE OF CORRECTION

Patent No. 3,808,126 (S.N. 202,377)  Dated  April 30, 1974

Inventor(s)  Louis A. Pradt

It is certified that error appears in the above-identified patent and that said Letters Patent are hereby corrected as shown below:

Column 1, line 58, after "stream" insert: --is at a lower pressure than that at the reactor bottom due to the pressure drop in the reactor outlet flow stream--.

Column 1, delete lines 59 and 60.

Signed and sealed this 8th day of October 1974.

(SEAL)
Attest:

McCOY M. GIBSON JR.
Attesting Officer

C. MARSHALL DANN
Commissioner of Patents